United States Patent Office.

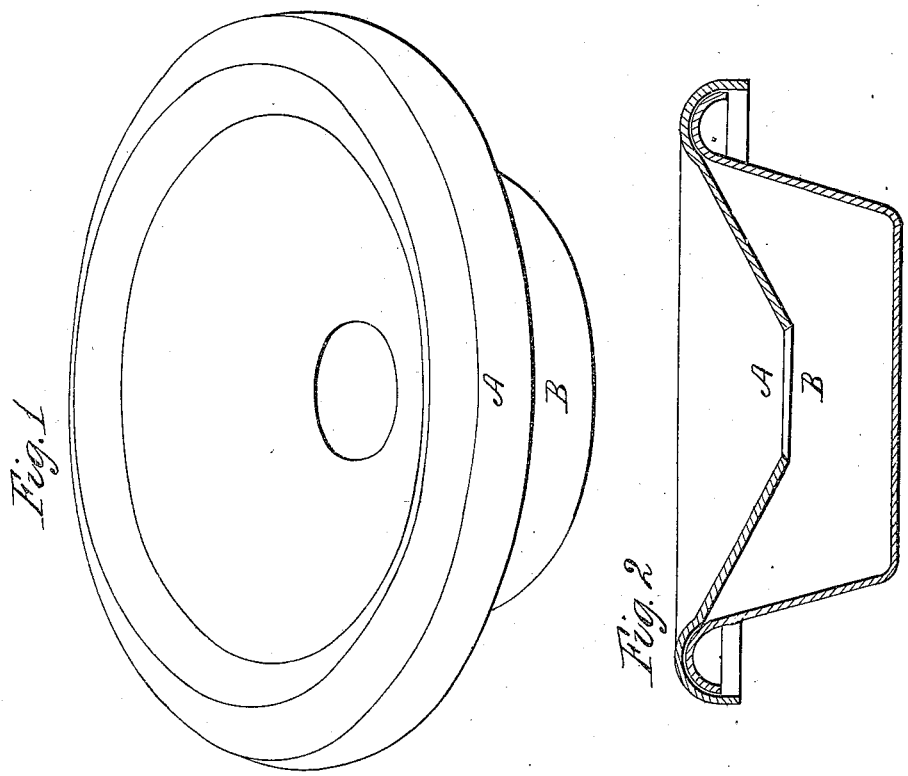

FRANK E. DARROW, OF BRISTOL, CONNECTICUT, ASSIGNOR TO THE DARROW MANUFACTURING COMPANY, OF THE SAME PLACE.

*Letters Patent No. 77,594, dated May 5, 1868.*

IMPROVED SPITTOON.

*The Schedule referred to in these Letters Patent and making part of the same.*

TO ALL WHOM IT MAY CONCERN:

Be it known that I, FRANK E. DARROW, of Bristol, in the county of Hartford, and State of Connecticut, have invented a new and improved Spittoon; and I do hereby declare that the following is a full, clear, and exact description thereof, which will enable others skilled in the art to make and use the same, reference being had to the accompanying drawings, making a part of this specification, in which—

Figure 1 is a perspective view of my invention.

Figure 2 is a transverse section of the same.

A denotes the cover, or upper part of the spittoon. B denotes the cup, or lower part of the same.

Similar letters of reference indicate like parts.

My invention consists in the use or employment of raw hide in the manufacture of spittoons. By the term raw hide, I mean the untanned hides of neat stock, horses, or any other animal. Simply removing the hair with lime, by sweating, or otherwise, is not considered tanning the hides.

To make a spittoon, I first saturate a raw-hide blank, by a process patented by me, May 1, 1866, and press or swage it in dies into any desired shape. The cup B, or lower part of the spittoon, is pressed or swaged in one piece, and the cover, A, in another.

When the spittoon is formed, it should be coated with a suitable water-proof paste or cement, and then painted or ornamented in any proper manner.

By making a spittoon with a cover, A, which removes, the spittoon can be easily cleansed, which is not the case with the ordinary earthen ones.

A raw-hide spittoon cannot be broken, and, if made of suitable stock, will hold a man's weight without changing its shape. It has all the advantages claimed for rubber ones, and none of the offensive smell of rubber, and can be made at a much less cost.

By my invention, I produce an article for spittoons, at a small cost, that is strong and durable, easy to clean, and so light that it will not hurt the toes of a gentleman in slippers, if he chance to stub them against it.

What I claim as new, and desire to secure by Letters Patent, is—

The use or employment of raw hide in the manufacture of spittoons.

FRANK E. DARROW.

Witnesses:
JOHN A. WAY,
JAMES SHEPARD.